(12) United States Patent
Priborsky

(10) Patent No.: US 11,987,970 B2
(45) Date of Patent: May 21, 2024

(54) WASTE SYSTEM OF HEIGHT-ADJUSTABLE TOILET

(71) Applicant: DOMKAT, S.R.O., Jihlava (CZ)

(72) Inventor: Dusan Priborsky, Jihlava (CZ)

(73) Assignee: DOMKAT, S.R.O. (CZ)

( * ) Notice: Subject to any disclaimer, the term of this patent is extended or adjusted under 35 U.S.C. 154(b) by 94 days.

(21) Appl. No.: 17/922,774

(22) PCT Filed: May 28, 2021

(86) PCT No.: PCT/CZ2021/000022
§ 371 (c)(1),
(2) Date: Nov. 1, 2022

(87) PCT Pub. No.: WO2021/259400
PCT Pub. Date: Dec. 30, 2021

(65) Prior Publication Data
US 2023/0167634 A1    Jun. 1, 2023

(30) Foreign Application Priority Data
Jun. 24, 2020   (CZ) ................................ CZ2020-364

(51) Int. Cl.
*E03D 11/12*   (2006.01)
*E03D 11/14*   (2006.01)

(52) U.S. Cl.
CPC .......... *E03D 11/143* (2013.01); *E03D 11/125* (2013.01)

(58) Field of Classification Search
CPC ...... E03D 11/12; E03D 11/125; E03D 11/143
USPC .......................................................... 4/252.3
See application file for complete search history.

(56) References Cited

U.S. PATENT DOCUMENTS

| 5,199,113 | A | * | 4/1993 | Glasow | E03D 11/125 |
| | | | | | 4/252.2 |
| 6,000,070 | A | * | 12/1999 | Bonin | E03D 11/08 |
| | | | | | 4/252.3 |
| 6,496,989 | B1 | * | 12/2002 | Meiser | E03D 11/12 |
| | | | | | 4/312 |
| 2021/0047821 | A1 | * | 2/2021 | Diethelm | E03D 11/16 |

FOREIGN PATENT DOCUMENTS

| EP | 1359262 A1 | 11/2003 |
| EP | 2639366 A1 | 9/2013 |
| EP | 3354809 A1 | 12/2018 |
| JP | 2010138548 A | 6/2010 |

* cited by examiner

*Primary Examiner* — Huyen D Le
(74) *Attorney, Agent, or Firm* — Bryant J. Keller; Kirton McConkie

(57) ABSTRACT

A waste system of a height adjustable toilet comprising a fixed frame with a vertically mounted sliding plate thereon, wherein the waste system comprises a piping system with a series connected upper pipe, an upper elbow, a connecting pipe, a lower elbow, and a lower pipe, wherein the upper sleeve is fixed to the sliding plate and the lower sleeve is attached to the fixed frame, the upper elbow on the upper sleeve and the lower elbow on the lower sleeve being seated freely pivotable about their axial axes and the connecting pipe being made of elastically flexible material.

4 Claims, 6 Drawing Sheets

WASTE SYSTEM OF HEIGHT-ADJUSTABLE TOILET

FIELD OF TECHNOLOGY

Figure 1:
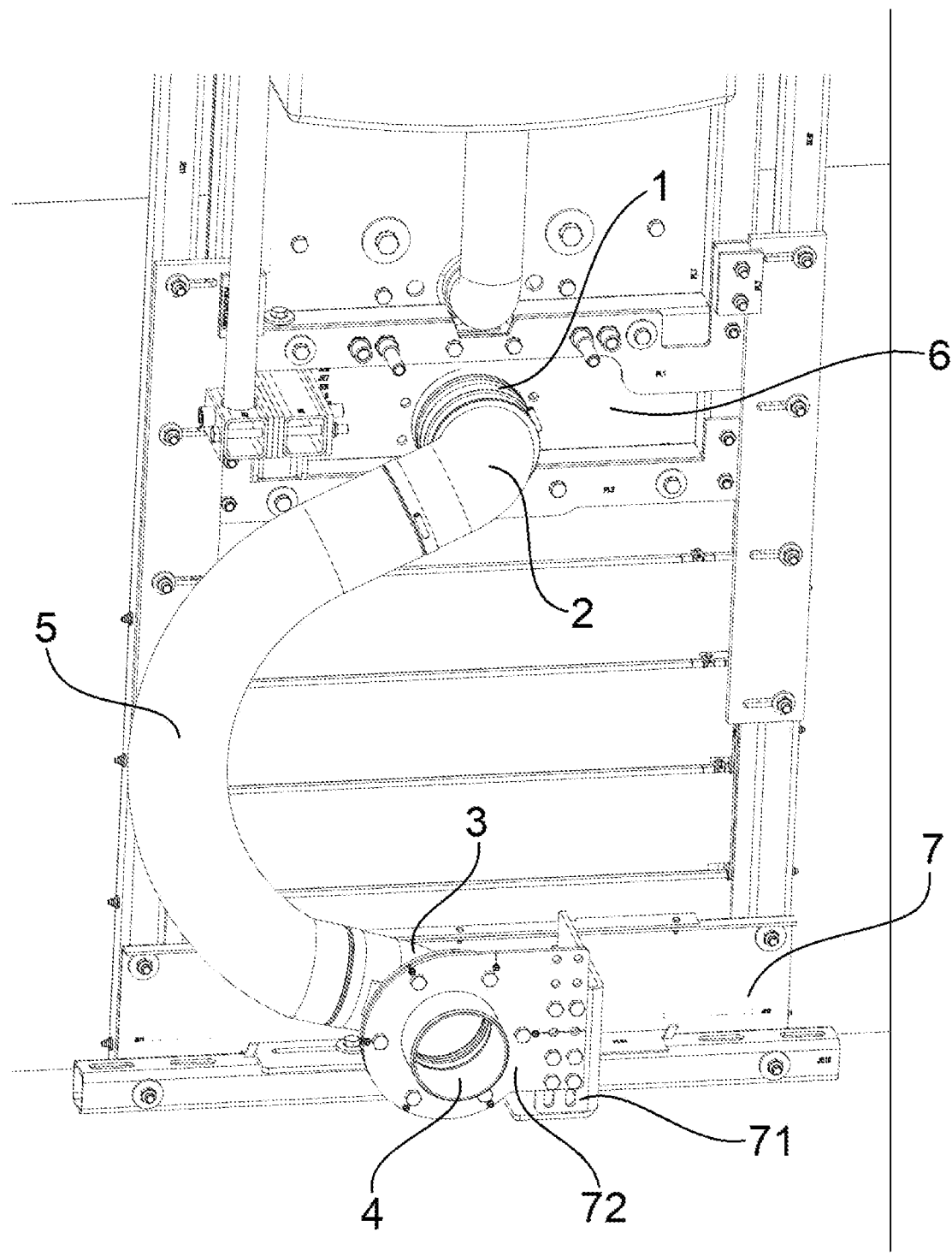

The invention falls within the field of flush to constructions and relates to the waste system of a height-adjustable toilet, in particular for persons with reduced mobility.

STATE OF THE ART TO DATE

Height-adjustable toilets are used especially where a toilet is used by people of various heights, they are very suitable in medical facilities or everywhere where there is a requirement for usability of the toilet for people with reduced mobility or physical disability in general. In such embodiments, however, it is necessary to solve the problem of connecting the toilet to the building's waste system. Document EP1359262A1 describes the connection of the height-adjustable toilet to the waste management of the building by a vertical telescopic pipe system, where the waste pipe of the toilet is inserted into the waste pipe in the floor of the building while the toilet moves upwards or downwards. File EP2639368A1 introduces a waste solution for a height adjustable toilet using a collapsible bellows, where the waste pipe is again placed vertically in the floor of the building. These systems do not allow the connection of a height-adjustable toilet to the building's waste line, which is designed as a horizontal pipe located behind the toilet in the building wall.

The objective of the invention is to present a solution for the waste pipe of a height adjustable toilet, which would allow the toilet to be connected to the waste line of a building embedded in the wall behind the toilet in a horizontal direction.

PRINCIPLE OF THE INVENTION

The stated objective is achieved by the invention, which is a waste system of a height-adjustable toilet, comprising a fixed frame and a vertically mounted sliding plate, wherein the waste system is formed by a pipeline. The essence of the invention is that the pipeline comprises an upper sleeve, n upper elbow, a connecting pipe, a lower elbow and a lower sleeve connected in series, wherein the upper sleeve is fixed to a sliding plate and the lower sleeve is fixed to a fixed frame, wherein, on the one hand, the upper elbow on the upper sleeve and the lower elbow on the lower sleeve are freely pivotable about their axial axes and, on the other hand, the connecting tube is made of a resiliently flexible material.

In a preferred embodiment, the upper sleeve is seated in the inlet port of the upper elbow by a threaded connection formed by the outer sleeve thread and the inner thread of the inlet port, and the lower elbow is seated with its outlet port on the lower sleeve by a threaded connection formed by the inner threaded segment of the outlet port and the outer threaded segment of the lower sleeve.

Further advantageously, the lower sleeve is secured is its collar in a bracket mounted vertically and adjustably in a beam which is horizontally and adjustably placed on the fixed frame of the height-adjustable toilet.

The present invention achieves a new and superior effect in that it enables a flexible, structurally simple, and thus low-cost connection of a height-adjustable toilet to the waste line of a building, the inlet of which is made as a horizontal element embedded behind the toilet in the wall of the building, without the need for special building or structural modifications using commonly available fittings.

EXPLANATIONS OF DRAWINGS

Figure 2:
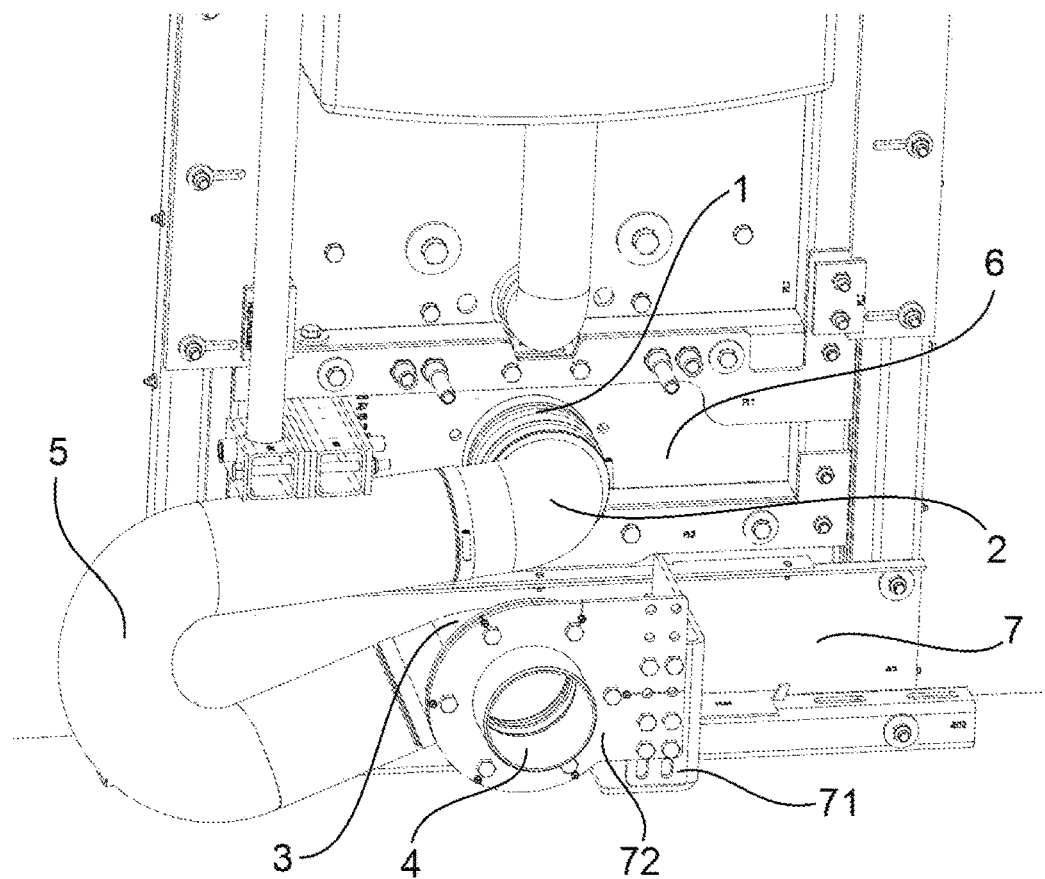
Figure 3:
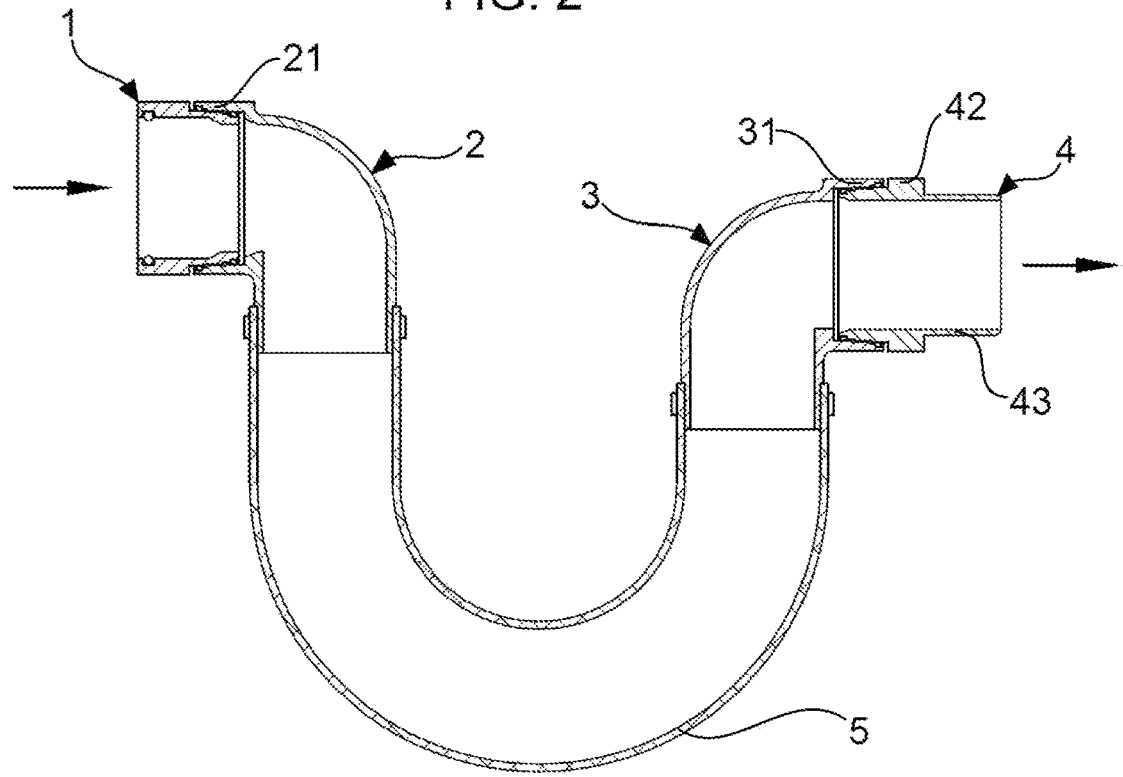
Figure 4:
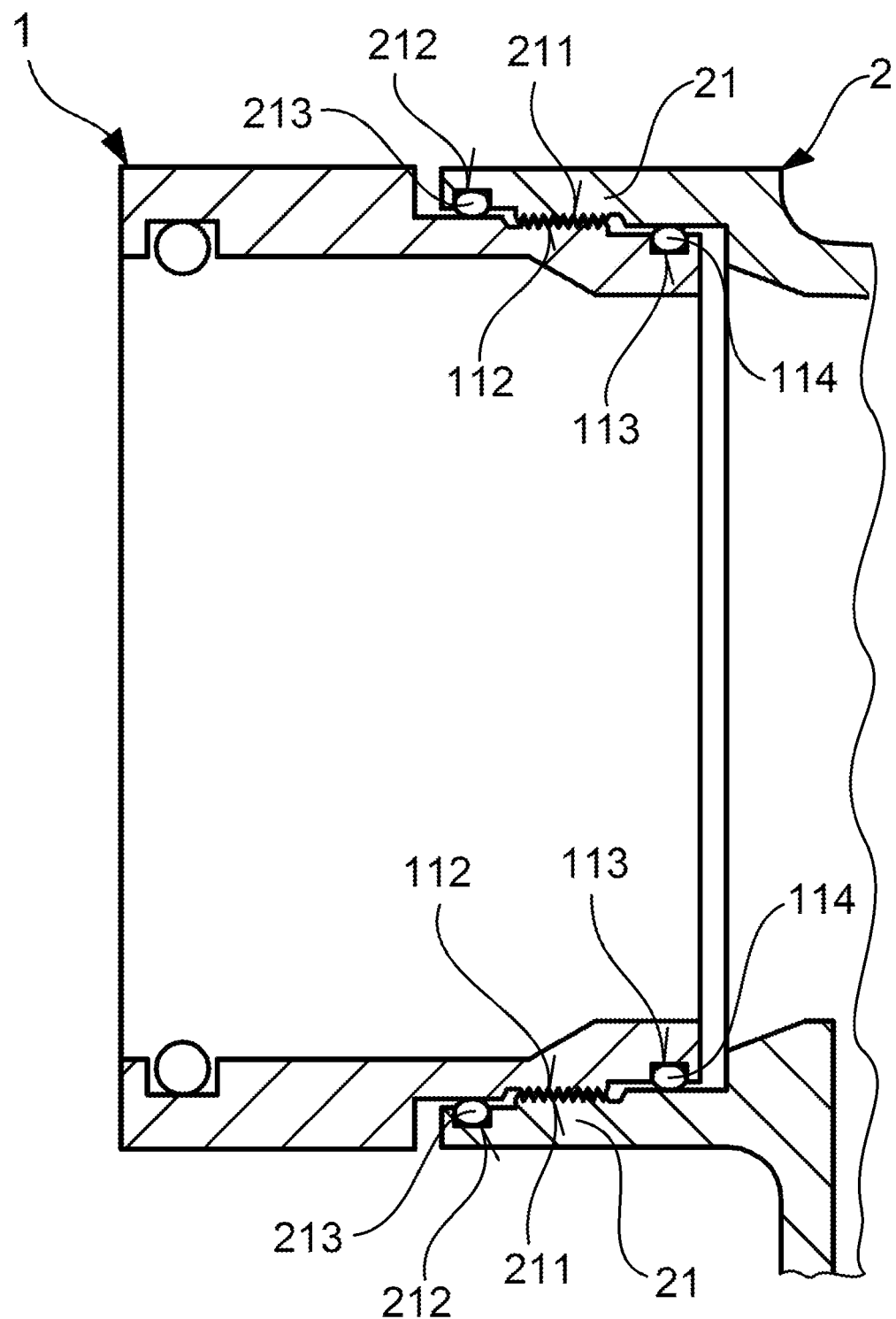
Figure 5:
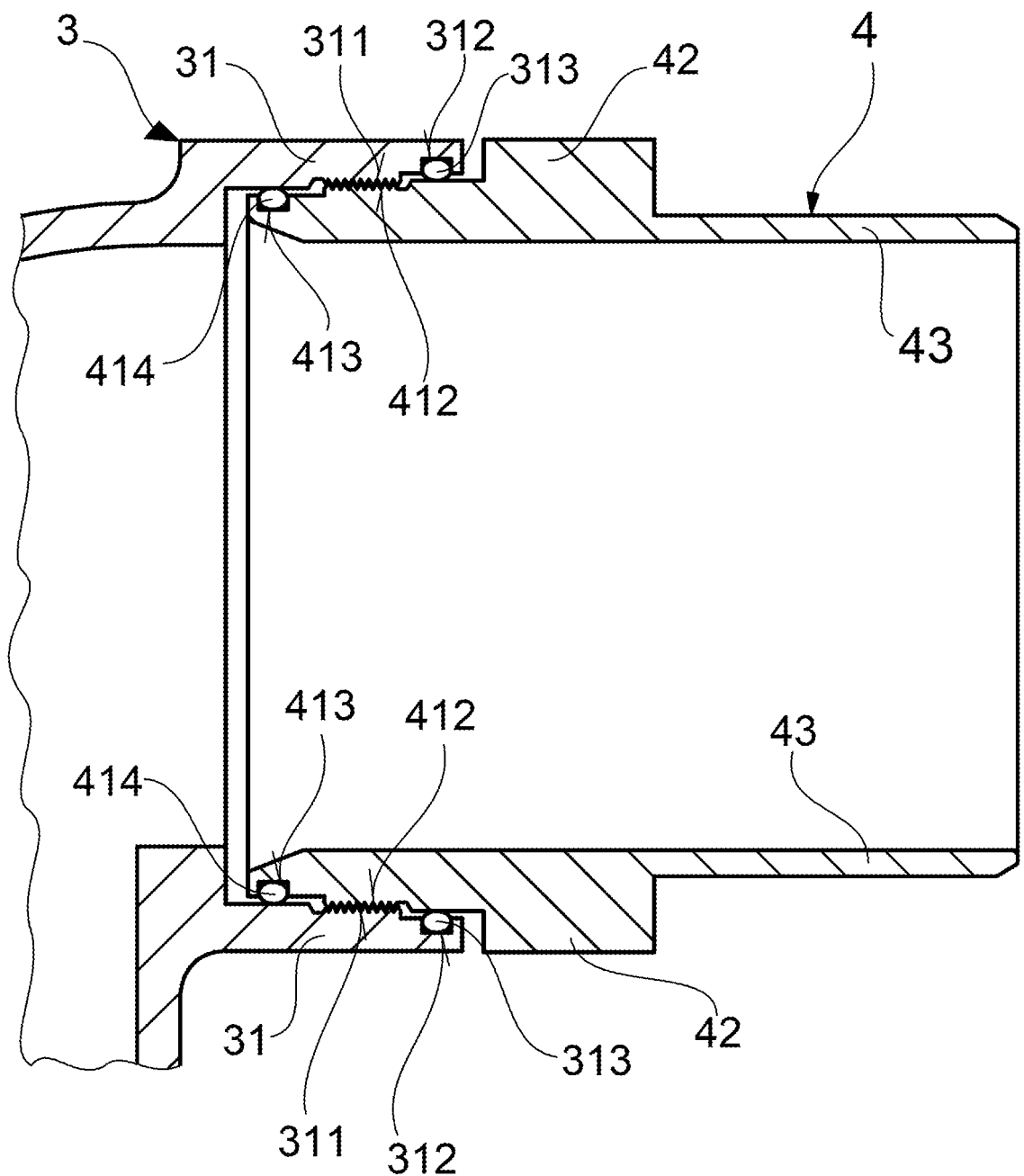
Figure 6:
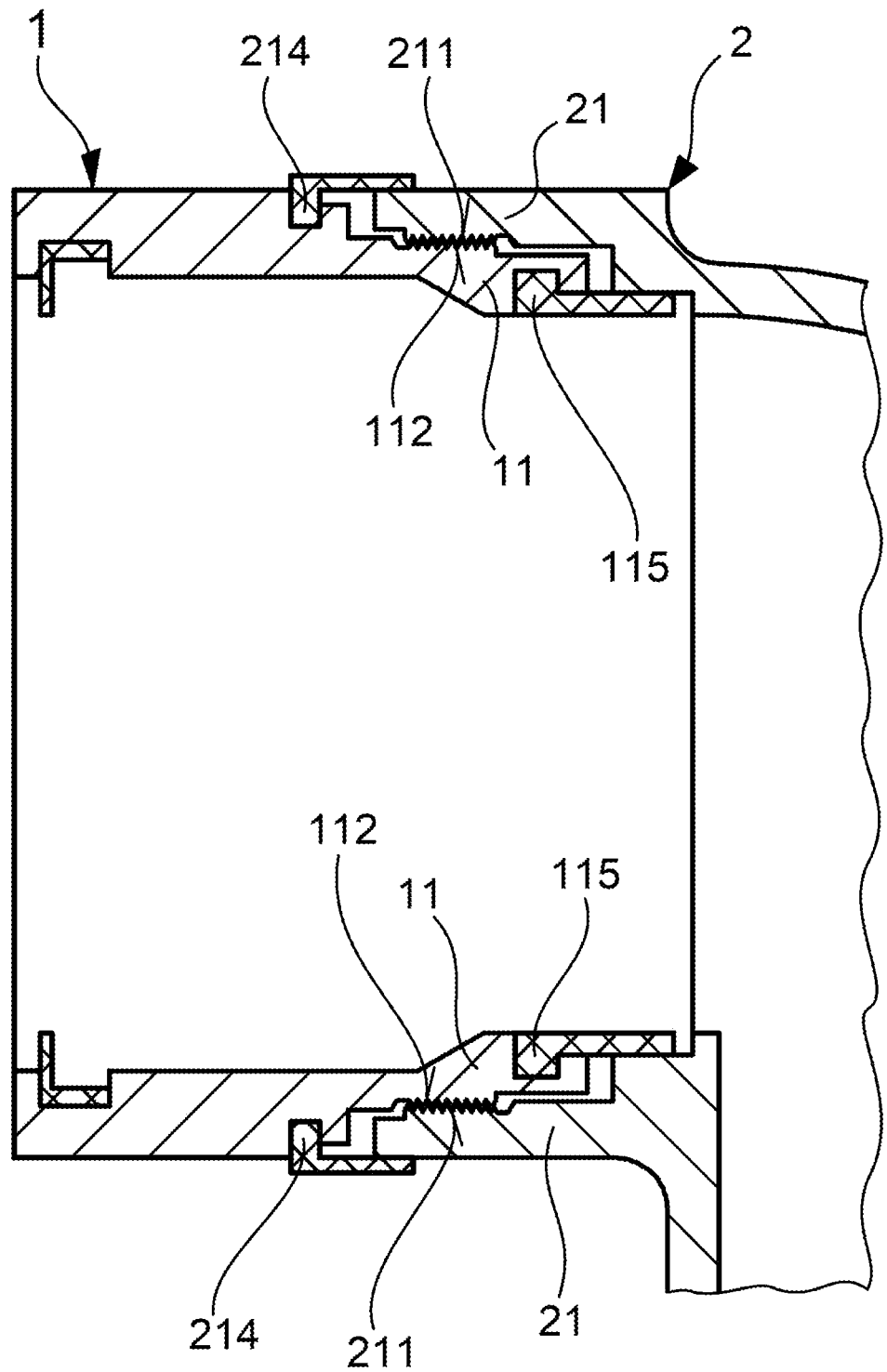
Figure 7:
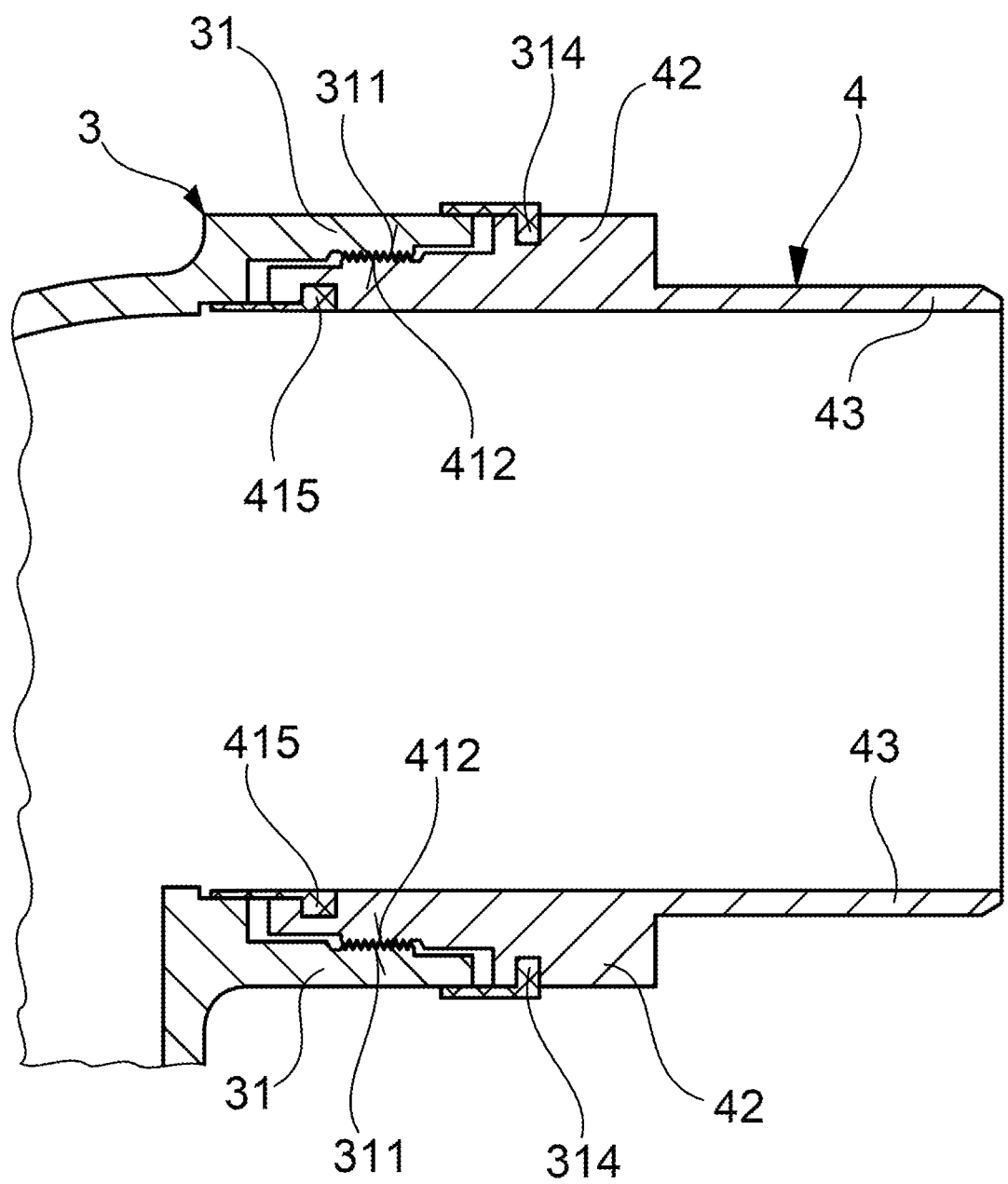

Specific examples of the invention design are shown in the accompanying drawings which present:

FIG. 1 is an overall rear view of the height-adjustable toilet with the waste system in the upper position, FIG. 2 is an overall rear view of the height-adjustable toilet with the waste system in the lower position, FIG. 3 is a sectional schematic drawing of the waste system, FIG. 4 is a sectional view of the connection of the upper sleeve to the upper elbow, FIG. 5 is a sectional view of the connection of the lower elbow to the lower sleeve, FIG. 6 is a sectional view of an alternative connection of the upper sleeve to the upper elbow and FIG. 7 is a sectional view of an alternative connection of the lower elbow to the lower sleeve.

The drawings illustrating the present invention and the following examples of a particular design do not in any way limit the scope of protection stipulated in the definition, but merely illustrate the principle of the invention.

EXAMPLES OF INVENTION EMBODIMENTS

According to the accompanying illustrations, the waste system of the height-adjustable toilet, which comprises a fixed frame 7 with a vertically fixed sliding plate 6, comprises a reduced upper sleeve 1 on which is seated an upper elbow 2 connected by a connecting pipe 5 made of resiliently flexible material to a lower elbow 3 which is seated on a lower sleeve 4. The upper sleeve 1 is fixed to the sliding plate 6 of the height-adjustable toilet. As shown in FIG. 4, the upper sleeve 1 is seated in the inlet port 21 of the upper elbow 2 by a threaded connection formed by the outer sleeve thread 112 and the inner thread 211 of the inlet port 21, the upper elbow 2 being seated on the upper sleeve 1 freely pivotable about its axial axis. The tightness of the connection between the upper sleeve 1 and the upper elbow 2 is ensured by both an annular outer sleeve seal 114 seated in the outer sleeve groove 113 and a sealing ring 213 seated in the inner groove 212 of the inlet port 21. The described solution for sealing the joint is not the only possible solution. As illustrated in FIG. 6, the tightness of the connection is ensured by the inner sleeve seal 115 and the outer seal 214 of the inlet port 21. The tightness of the joint can also be performed by other commonly known means. A connecting pipe 5 is connected to the upper elbow, which is further connected to the lower elbow 3. As shown in FIG. 5, the lower elbow 3 is seated with its outlet neck 31 on the lower sleeve 4 by means of a threaded connection formed by the inner threaded segment 311 of the outlet port 31 and the outer threaded segment 412 of the lower sleeve 4, the lower elbow 3 being seated on the lower sleeve 4 freely pivotable about its axial axis. The tightness of the connection between the lower elbow 3 and the lower sleeve 4 is ensured by, on the one hand, an annular sealing member 313 housed in the inner flange 312 of the outlet port 31 and, on the other hand, an annular sealing member 414 housed in the outer flange 413 of the lower sleeve 4. The described solution for sealing the joint is not the only possible solution. According to the illustration in FIG. 7, the tightness of the joint is ensured by the outer sealing member 314 of the outlet port 31 and the inner sealing member 415 of the lower sleeve 4. The lower sleeve 4 is held, via its collar 42, in a bracket 72 fixed vertically adjustably in a beam 71 which is fixed horizontally adjustably on the fixed frame 7 of the height-adjustable toilet. The outlet sleeve segment 43 of the lower nozzle 4 is then seated in the unshown inlet of the building waste system.

When the sliding plate 6 of the height-adjustable toilet and the upper sleeve 1 mounted thereon move downwards from the upper end position, the connecting tube 5 is bent due to the elastically flexible material of which it is made, and at the same time the inlet port 21 of the upper elbow 2 around the upper sleeve 1 and the outlet port 31 of the lower elbow 3 move around the lower sleeve 4 due to their mutual threaded connections.

INDUSTRIAL USABILITY

The present invention is useful in the construction of toilets in environments with users of various heights, possibly for persons with reduced mobility, and also for use in medical facilities.

The invention claimed is:

1. A waste system of a height-adjustable toilet comprising a fixed frame with a vertically mounted sliding plate thereon, wherein the waste system comprises a piping system, wherein the piping system comprises a serially connected upper sleeve, an upper elbow, a connecting pipe, a lower elbow, and a lower sleeve, wherein the upper sleeve is fixed to a sliding plate and the lower sleeve is attached to a fixed frame, the upper elbow on the upper sleeve and the lower elbow on the lower sleeve being seated freely pivotable about their axial axes and the connecting pipe being made of elastically flexible material.

2. The waste system according to claim 1, wherein the upper sleeve is seated in an inlet port of the upper elbow through a first threaded connection formed by an outer sleeve thread and an inner thread of the inlet port, and the lower elbow being, by an outlet port, is mounted on the lower sleeve by means of a second threaded connection formed by an inner threaded segment of the outlet port and an outer threaded segment of the lower sleeve.

3. The waste system according to the claim 2, wherein the lower sleeve is fixed, via a collar, in a bracket that is vertically adjustable with respect to a beam, which is horizontally adjustable on a fixed frame of the height-adjustable toilet.

4. The waste system according to the claim 1, wherein the lower sleeve is fixed, via a collar, in a bracket that is vertically adjustable with respect to a beam, which is horizontally adjustable on a fixed frame of the height-adjustable toilet.

* * * * *